(12) United States Patent
Liu

(10) Patent No.: US 8,078,234 B2
(45) Date of Patent: Dec. 13, 2011

(54) APPARATUS AND METHOD FOR PROVIDING A MASSAGE FUNCTION FOR A MOBILE PHONE

(75) Inventor: Qing-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 526 days.

(21) Appl. No.: 12/372,874

(22) Filed: Feb. 18, 2009

(65) Prior Publication Data
US 2009/0286571 A1    Nov. 19, 2009

(30) Foreign Application Priority Data
May 19, 2008  (CN) .......................... 2008 1 0301638

(51) Int. Cl.
*H04M 1/00*  (2006.01)

(52) U.S. Cl. ...................................... 455/567; 455/550.1
(58) Field of Classification Search .................. 455/567, 455/550.1
See application file for complete search history.

(56) References Cited

U.S. PATENT DOCUMENTS

| | | | |
|---|---|---|---|
| 6,904,289 B1 * | 6/2005 | Narusawa | 455/522 |
| 7,292,879 B2 * | 11/2007 | Cho | 455/567 |
| 7,540,847 B2 * | 6/2009 | Klein et al. | 601/46 |
| 7,805,785 B2 * | 10/2010 | Rawls-Meehan | 5/616 |

* cited by examiner

Primary Examiner — James H Cho
(74) Attorney, Agent, or Firm — Altis Law Group, Inc.

(57) ABSTRACT

An apparatus for providing a massage function for a user of a mobile phone includes an in-call status module, a vibrating motor, and a processor. The status module is configured to sending a call making signal when the user is making a phone call via the mobile phone. The processor is coupled to the status module and the vibrating motor to receive the call making signal and to control vibration of the vibrating motor. The vibrating motor vibrates regularly to provide the massage function during a duration of the call.

6 Claims, 2 Drawing Sheets

APPARATUS AND METHOD FOR PROVIDING A MASSAGE FUNCTION FOR A MOBILE PHONE

BACKGROUND

1. Technical Field

The present disclosure relates to an apparatus and method for providing a massage function for a mobile phone.

2. Description of Related Art

It is not uncommon for mobile phone users to engage in long phone calls. As a result, the users may experience physical discomfort from muscle fatigue, particularly in their hands.

Therefore, what is desired, is an apparatus and method to alleviate discomfort during long phone calls.

DETAILED DESCRIPTION OF THE EMBODIMENTS

Figure 1:
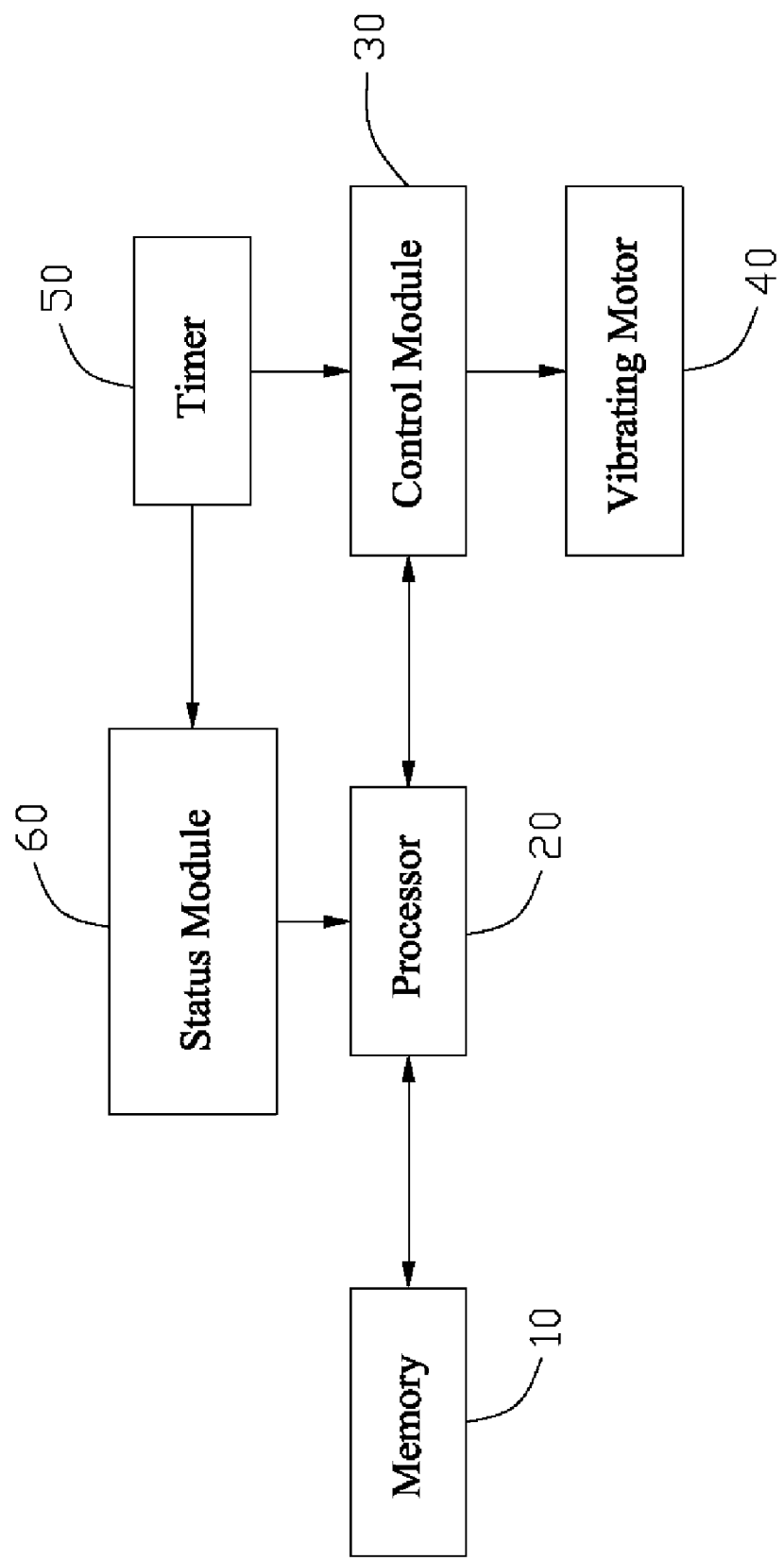
FIG. 1 is a block diagram of an apparatus for providing massage function in a mobile phone.

Referring to FIG. 1, an apparatus for providing massage function in a mobile phone includes a memory 10, a processor 20 coupled to the memory 10, a control module 30 connected to the processor 20, a vibrating motor 40 connected to the control module 30, a timer 50 coupled to the control module 30, and a status module 60 coupled to the processor 20. The apparatus can be assembled in the mobile phone.

The memory 10 comprises a non-volatile memory (e.g., read-only memory, FLASH memory, etc). Software instructions pertaining to various features of the mobile phone system are stored in the memory 10. The various features include which instructions are to be used under different circumstances. The processor 20 is configured to process these instructions. The control module 30 is configured to send control signals to the vibrating motor 40. When a user places or receives a call using the mobile phone, the status module 60 sends an in-call signal to the processor 20 until the call ends. The timer 50 starts timing the duration of the in-call signal. If the duration of the in-call signal exceeds a predetermined interval, the control module 30 powers on the vibrating motor 40. The vibrating motor 40 vibrates to massage the hand of the user as the user is holding the mobile phone. The vibrating motor 40 may be controlled to continue vibrating for the remainder of the call or to vibrate for a predetermined amount of time and repeat at regular intervals. Frequency of the vibration can be predetermined or adjusted according to user input. Using the massage function, the user may feel less discomfort or avoid discomfort altogether even though the user is making a call for a long period of time without any other physical activity. The intermittent and regular vibrations can also remind the user the call has become quite long. When the call is finished, the status module 60 stops sending the in-call signal, the timer 50 stops timing, and resets to zero. As the processor 20 is no longer receiving the in-call signal, the motor 40, under command of the control module 30, stops running either at the end of the phone call or at the end of a current vibrating mode according to predetermined parameters. It should be understood that the vibrating function of the mobile phone may be activated at any time by input of the user even when a call is not being made.

Figure 2:
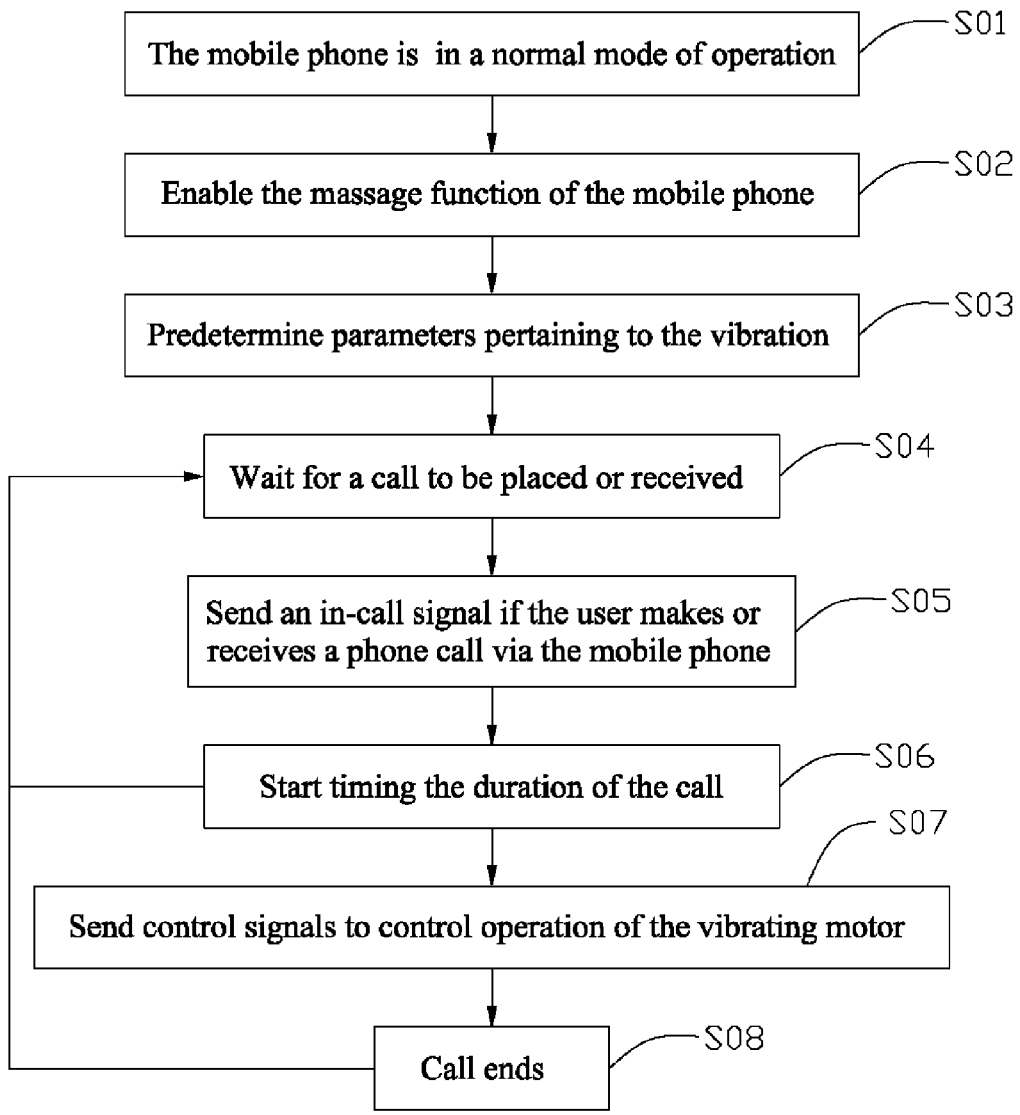
FIG. 2 is a flowchart of a method for providing massage function in a mobile phone.

Referring to FIG. 2, a method utilizing above described apparatus for providing a massage function for mobile phone users includes following blocks.

In block S01, the mobile phone is in a normal mode of operation.

In block S02, the massage function of the mobile phone is enabled.

In block S03, predetermined parameters pertaining to the vibration, such as a begin-time of the vibration during a phone call, a duration of the vibration, or a frequency of the vibration, for example, may be predetermined by a user of the mobile phone.

In block S04, the user waits for a call to be placed or received.

In block S05, the status module 60 sends an in-call signal to the processor 20 if the user makes or receives a phone call via the mobile phone.

In block S06, timing duration of the call may begin. If the mobile phone is set to vibrate at pre-determined interval(s), the flow moves to block S07. If call ends before a first predetermined interval is reached, the flow returns to block S04.

In block S07, control signals to control operation of the vibrating motor 40 according to the predetermined parameters of block S03 are sent. For example, if the predetermined interval is two minutes, the vibrating motor starts to vibrate after every two minutes for a predetermined duration and at a predetermined frequency during the duration of the call.

In block S08, the flow may return to block S04 when the call ends, thus ending the vibrating mode according to the predetermined parameters of block S03.

It is to be understood, however, that even though numerous characteristics and advantages of the present disclosure have been set forth in the foregoing description, together with details of the structure and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. An apparatus for providing a massage function for a user of a mobile phone comprising:
    a status module capable of sending a call making signal when the user makes a phone call via the mobile phone;
    a vibrating motor of the mobile phone capable of regularly vibrating to provide the massage function to the user during a duration of the phone call;
    a control module connected to the vibrating motor to start or stop the vibration according to user determined parameters;
    a timer capable of timing the duration of the call making signal and the duration of the vibration; and
    a processor coupled to the status module and the control module to receive the call making signal and to control the vibration of the vibrating motor according to the user determined parameters.

2. The apparatus of claim 1, further comprising a memory to store software instructions pertaining to the massage function, wherein the memory is coupled to the processor.

3. A method for providing a massage function for a user of a mobile phone, the method comprising:
    sending a call making signal when the user makes a phone call via the mobile phone;

regularly vibrating a vibration motor of the mobile phone to provide the massage function to the user during a duration of the phone call;

starting or stopping the vibration according to the duration of the call and according to user determined parameters;

timing the duration of the call making signal and the duration of the vibration; and receiving and executing the call making signal and controlling vibration of the vibrating motor according to the user determined parameters using a processor of the mobile phone.

4. The method of claim 3, further comprising comparing the duration of the call making with a predetermined time interval of the vibrating motor.

5. The method of claim 4, wherein the vibrating motor starts to vibrate at pre-determined time interval(s).

6. The method of claim 5, further comprising predetermining a duration of the vibration at every pre-determined time interval, and a frequency of the vibration at every pre-determined time interval.

* * * * *